(12) United States Patent
Koitabashi

(10) Patent No.: US 6,367,923 B1
(45) Date of Patent: Apr. 9, 2002

(54) INK-JET PRINTING METHOD, SYSTEM USING AN INK AND A TREATING LIQUID, AND INK SET

(75) Inventor: Noribumi Koitabashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,514

(22) Filed: Dec. 22, 1999

(30) Foreign Application Priority Data

Dec. 24, 1998 (JP) .......................................... 10-368007

(51) Int. Cl.⁷ .................................................. B41J 2/01
(52) U.S. Cl. .................................................... 347/101
(58) Field of Search ........................... 347/1, 103, 106, 347/101, 96; 106/23, 31.58; 523/161

(56) References Cited

U.S. PATENT DOCUMENTS

| | | | | |
|---|---|---|---|---|
| 5,100,471 A | * | 3/1992 | Winnik et al. | 106/23 |
| 5,640,187 A | * | 6/1997 | Kashiwazaki et al. | 347/101 |
| 5,679,724 A | * | 10/1997 | Sacripante et al. | 523/161 |
| 5,788,754 A | * | 8/1998 | Deardurff et al. | 106/31.58 |
| 6,007,182 A | | 12/1999 | Matsubara et al. | 347/43 |

* cited by examiner

Primary Examiner—Anh T. N. Vo
(74) Attorney, Agent, or Firm—Fitzpatrick, Cella, Harper & Scinto

(57) ABSTRACT

Ink-jet printing with fixing ability, while maintaining printing qualities such as OD and sharpness at high levels, can be achieved by using an ink containing a self-dispersing pigment as a coloring material without using a dispersant and a treating liquid for insolubilizing the coloring material. Benalkonium chloride (G50) having one cationic group in the molecule is used as the insolubilizing agent in the treating liquid. As a result, the cationic group is completely bonded to the anionic group of the pigment particle, thereby producing a cohesive force between pigment particles.

24 Claims, 6 Drawing Sheets

INK-JET PRINTING METHOD, SYSTEM USING AN INK AND A TREATING LIQUID, AND INK SET

BACKGROUND OF THE INVENTION

1. Field of the Invention

The present invention relates to an ink printing method and to an ink-jet printing system and, more specifically, to an ink printing method to conduct printing using a treating liquid for substantially insolubilizing a coloring material contained in ink and to an ink-jet printing system. The ink printing method and ink-jet printing system of the present invention can be applied to apparatus such as printers, copiers, or facsimiles for printing characters, images and the like on a printing medium such as paper, and used as a printing unit in these apparatus.

2. Related Background Art

The treating liquid for insolubilizing a coloring material such as a dye or pigment contained in ink is generally used to improve a water fastness of a printed image or the like. The present applicant has made various proposals, paying attention to the fact that the treatment solution not only improves the water fastness but also exerts a great influence upon printing qualities such as a density (for example, optical density (OD)) of a printed image and the sharpness of edge portions of a printed image. These printing qualities contribute particularly to the improvement of the quality of characters to be printed using a black ink in most cases.

SUMMARY OF THE INVENTION

As described above, printing using a combination of ink and a treating liquid can achieve high OD and high sharpness for the edge portions of an image, thereby making possible a high quality of printing that could not be attained in the prior art. However, an ink-jet printing system still has room for improvement of fixing ability, which has been discovered through studies conducted by the present inventor.

For example, to print a large number of printing paper sheets continuously, the printing paper sheets discharged after printing are placed one upon another sequentially. In this case, when the permeation of ink onto printing paper is insufficient and ink remains on the surface of the printing paper, the remaining ink is transferred to another printing paper and stains the printing paper. Thus, the paper discharge speed must be slowed down to prevent ink from staining another printing paper when ink fixing is slow regardless of the capability of a print head or the capability of a printing paper feed system. Therefore, the fixing ability of an ink-jet printing system is a relatively large factor for limiting the number of printing paper sheets to be output per unit time.

The present invention has been made in view of the above situation, and has an object to provide an ink printing method and ink-jet printing system capable of conducting printing with excellent fixing ability which cannot be attained in the prior art and at least one of printing qualities (qualities for maintaining the quality of characters in particular to a high level) such as OD and sharpness.

The above object can be achieved by the present invention described below.

According to the present invention, there is provided an ink printing method to apply an ink on a medium, comprising the step of combining an ink containing at least a self-dispersing pigment having a first group with a polarity as a coloring material with a treating liquid, wherein the treating liquid contains a surfactant having in the molecule one second group having a polarity opposite to that of the first group of the pigment.

According to the present invention, there is also provided an ink-jet printing system to conduct printing by combining an ink containing at least a self-dispersing pigment having a first group with a polarity as a coloring material with a treating liquid on the surface of a printing medium, wherein the treating liquid contains a surfactant having in the molecule one second group having a polarity opposite to that of the first group of the pigment.

According to the above constitution, the group of the pigment can be completely bonded to the group of the surfactant, thereby enhancing cohesive force between the pigment particles. As a result, a combined product of ink and the treating liquid shows a high penetrability and does not form a dispersion of fine aggregates, but can form large uniform aggregates.

Therefore, according to the present invention, at least one printing quality and excellent fixing ability can be secured.

The combination of "ink" and "treating liquid" as used herein encompasses all the cases including one where they are combined on the surface of a medium and one where they are combined right before the surface of the medium or in space. Preferably, one of them is applied to paper and then the other is applied thereto, which are then combined with each other on the surface of paper. According to the object and effect of the present invention, ink or the treating liquid is preferably first applied to the paper. The reason for this will be understood from the following description.

DETAILED DESCRIPTION OF THE PREFERRED EMBODIMENTS

Embodiments of the present invention will be described in detail hereinunder with reference to the accompanying drawings.

The present inventor has conducted the following studies on ink-jet printing to achieve high printability, particularly in view of both character quality and fixing ability.

The inventor first has studied experimentally the improvement of fixing ability by using a treating liquid containing an insolubilizing agent for insolubilizing a coloring material contained in an ink and having a high penetrability and an ink containing a dye which is generally used for ink-jet printing as a coloring material, applying the treating liquid to printing paper before or after the ink has been applied, and superimposing it on the ink. However, it has been confirmed that, although fixing ability can be improved by using the treating liquid having a high penetrability, it is relatively difficult to improve the quality of characters because it is difficult to increase OD and so-called whisker-like feathering occurs. This tendency is particularly marked when plain paper which is frequently used for ink-jet printing is printed.

In the above case, a pigment dispersed in a polymer such as a styrene acrylic copolymer as a dispersant has been used as a coloring material in place of a dye. However, it has been found that penetration speed does not become so high though OD became high in this case.

In contrast to this, when a pigment which is self-dispersed in an aqueous solvent is used as a coloring material without a dispersant, an improvement in fixing ability (penetration speed) can be observed. However, when ink dots formed on a printing medium by ink containing the above pigment and the above-described high-penetrable treating liquid ejected from print heads are observed, the occurrence of thin hazy "bleeding" can be seen around the dots, which is not preferred for the improvement of printing qualities. This phenomenon is particularly marked when the treating liquid is applied to the printing medium after ink has been applied.

After studies on the cause of this hazy "bleeding", it has been found that the above "bleeding" markedly occurs when a cationic polymer material such as polyallylamine (to be abbreviated as PAA hereinafter) is used as an insolubilizing agent contained in the treating liquid.

Figure 1:
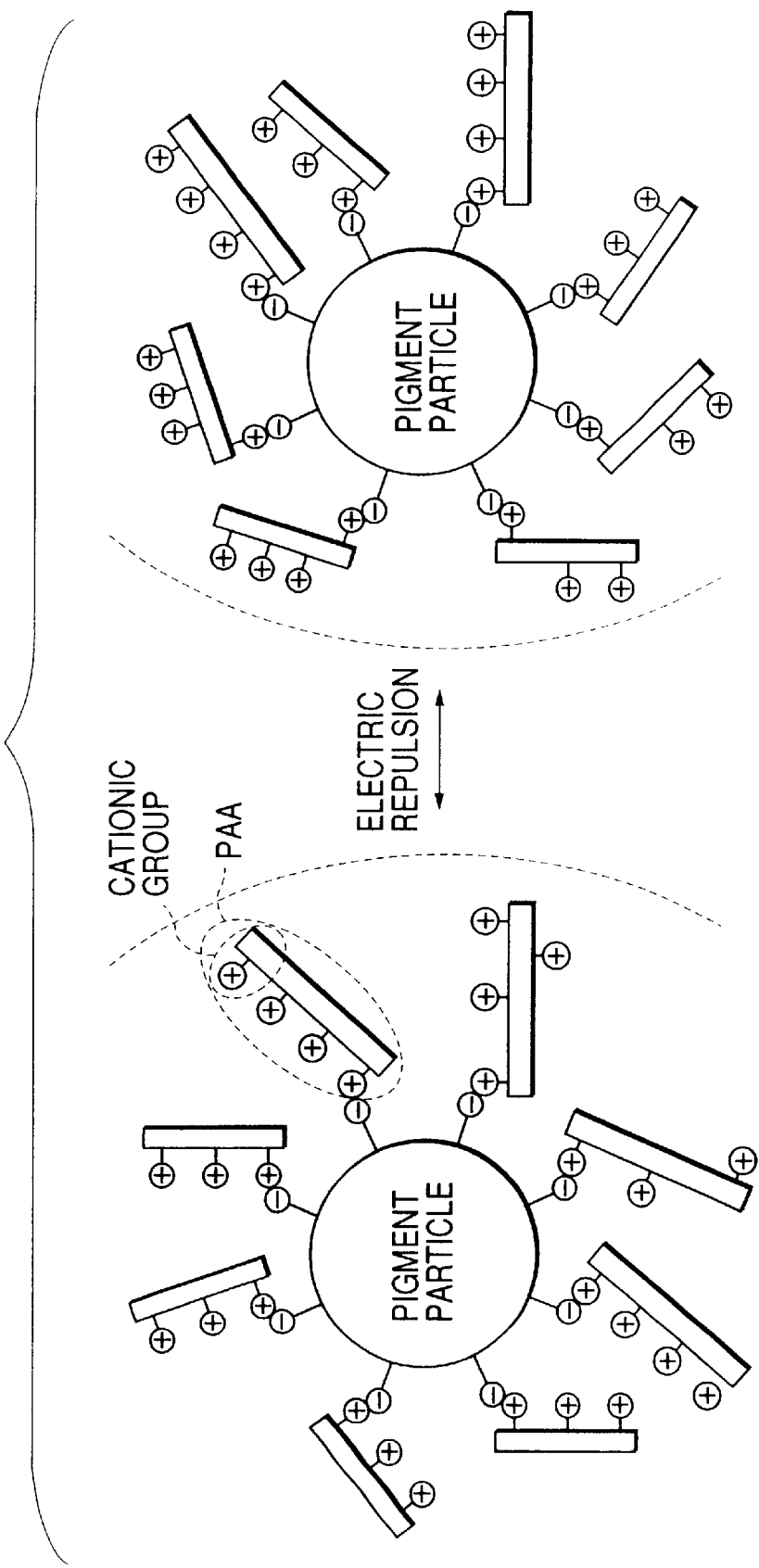
FIG. 1 is a drawing for schematically explaining an estimated reaction between a pigment as an ink coloring material and an insolubilizing agent contained in a treating liquid according to an embodiment of the present invention.

Presumed points on the mechanism of the occurrence of this phenomenon will be explained with reference to FIG. 1. FIG. 1 is a drawing for schematically showing a state where a pigment and PAA as an insolubilizing agent have been bonded.

As shown in FIG. 1, the self-dispersing pigment is pricky with a large number of whisker-like polar groups (anionic groups) therearound. Meanwhile, PAA which is a cationic polymer is a string-like substance having a plurality of cationic groups in the molecule. When the self-dispersing pigment is mixed with PAA, as shown in FIG. 1, the giant molecules of PAA surround the self-dispersing pigment. However, since the cationic groups of PAA cannot be bonded to all the anionic groups of the pigment geometrically, it is assumed that the pigment connected with cationic groups remain all cationic as shown in FIG. 1.

Therefore, it is presumed that a reaction product of a pigment particle having a small particle size and PAA has low inter-molecular force, is electrically repulsive and hardly agglomerates into a larger form. As a result, it is considered that when a dye is not used, these fine products appear as hazy "bleeding" around dots.

Meanwhile, the present inventors have conducted another study on a case where only benzalkonium chloride (to be abbreviated as EBK hereinafter) which is a surfactant is used as an insolubilizing agent contained in the treating liquid. In this case, the above-described hazy "bleeding" hardly occurs and a high OD value can be obtained. Further, good results of strike through obtained by observing density from a side (rear side) opposite to the dot formed side of a printing medium are obtained (the lower the density, the better the strike through becomes). The reason of the foregoing phenomena is as follows. The benzalkonium chloride has a molecular weight of 339.5 and is dissociated into chloride ion and konium ion in water. What should be noted in this embodiment is the konium ion (having a monovalent cationic group and a molecular weight of 304), and it is important to take into consideration the molecular weight of an ion having a reactive group as the molecular weight. As a more preferred condition for this embodiment, when an ion having a reactive group has a molecular weight of 1,000 or less, it can react with each polar group of a corresponding coloring material more efficiently.

It has been also found that the concentration of EBK in the treating liquid (concentration by weight in the liquid) is preferably ⅓ or more the concentration (concentration by weight) of the pigment in the ink.

Figure 2:
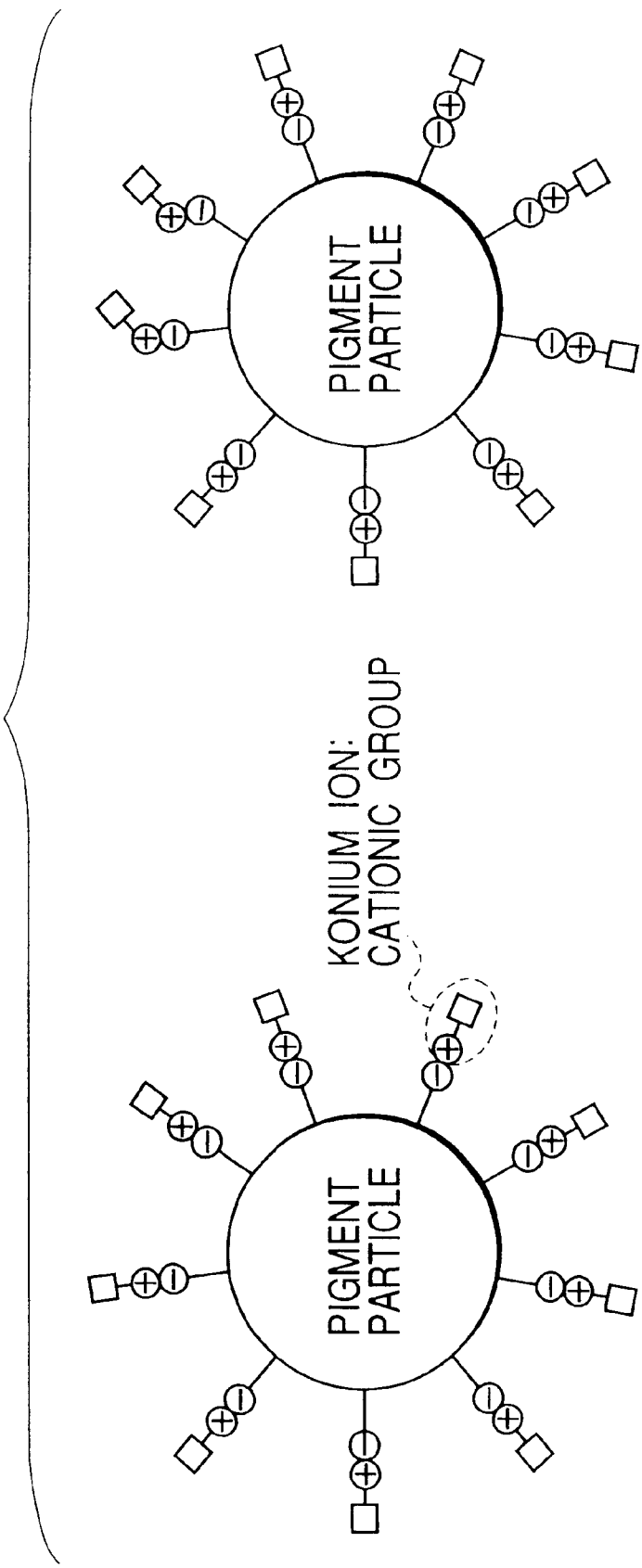
FIG. 2 is a drawing for schematically explaining another example of the above estimated reaction according to the embodiment of the present invention.

What is concluded from above is that, when EBK is used as shown in FIG. 2, konium ion is a surfactant having a smaller molecular weight than PAA (molecular weight of 1,500 or less, about 1,000 on average) and only one cationic group in the molecule and thereby can be bonded to the anion groups of the pigment particles not excessively and not insufficiently or mostly and that the above-described electric repulsion is not generated. As a result, it is considered that the pigment particles agglomerate by relatively large cohesive force, whereby hazy "bleeding" hardly occurs.

Printed products were obtained on plain paper in combination of inks A and B each containing the self-dispersing pigment as a coloring material with treating liquids 1 to 4 having the following compositions as shown in Table 1, by applying the treating liquid first and then applying the ink. The samples were evaluated for its "haze", "OD", "strike through", "edge sharpness" and "fixing ability" based on the following criteria. The results are shown in Table 2 below.

Printing conditions were as follows. Experiments were conducted using an ink ejection head and a treating liquid ejection head, in which so-called plain paper is fed to these heads, with a difference in time of impact between ink and the treating liquid of 0.05 to 0.3 second. A printed image was formed by laying down one drop of about 40 pl of black (Bk) ink and one drop of about 20 pl of the treating liquid on each of pixels arranged at a density of 720 dpi×360 dpi in such a manner that the treating liquid and the ink were impacted thereagainst. Printing was also carried out under another conditions on printing duty and the like, that is, about 30 pl of black ink and about 15 pl of the treating liquid were impacted against each of the pixels arranged at a density of 600 dpi×600 dpi.

| Ink composition | |
|---|---|
| Ink A (Ka = 0.35): | |
| self-dispersing black pigment | 5% by weight |
| ethylene oxide adduct of 2,4,7,9-tetramethyl-5-decyne-4,7-diol (Acetylenol EH, trade name: manufactured by Kawaken Fine Chemicals, Co., Ltd.) | 0.2% by weight |
| glycerol | 6% by weight |
| triethylene glycol | 5% by weight |
| water | balance |

-continued

| Ink composition | |
|---|---|
| Ink B (Ka = 5): | |
| self-dispersing black pigment | 5% by weight |
| Acetylenol EH | 0.7% by weight |
| glycerol | 6% by weight |
| triethylene glycol | 5% by weight |
| water | balance |

It can be generally said that as the content of Acetylenol increases and further as the Ka value increases, the penetrability becomes higher. Therefore, Ink B has higher penetrability than Ink A.

| Treating liquid 1: | |
|---|---|
| EBK | 4% by weight |
| Acetylenol EH | 2% by weight |
| glycerol | 7% by weight |
| diethylene glycol | 5% by weight |
| triethylene glycol monobutyl ether | 3% by weight |
| water | balance |
| Treating liquid 2: | |
| EBK | 2% by weight |
| Acetylenol EH | 2% by weight |
| glycerol | 7% by weight |
| diethylene glycol | 5% by weight |
| triethylene glycol monobutyl ether | 3% by weight |
| water | balance |
| Treating liquid 3: | |
| EBK | 1% by weight |
| Acetylenol EH | 2% by weight |
| glycerol | 7% by weight |
| diethylene glycol | 5% by weight |
| triethylene glycol monobutyl ether | 3% by weight |
| water | balance |
| Treating liquid 4: | |
| EBK | 3% by weight |
| PAA | 1% by weight |
| acetic acid | 1% by weight |
| Acetylenol EH | 2% by weight |
| glycerol | 7% by weight |
| diethylene glycol | 5% by weight |
| triethylene glycol monobutyl ether | 3% by weight |
| water | balance |

TABLE 1

| Experimental Examples | Ink | Treating Liquid |
|---|---|---|
| 1 | A | 1 |
| 2 | A | 2 |
| 3 | A | 3 |
| 4 | A | 4 |
| 5 | B | 1 |
| 6 | B | 2 |
| 7 | B | 3 |
| 8 | B | 4 |

TABLE 2

| Experimental Examples | Haze | OD | Strike-through | Edge Sharpness | Fixing Ability |
|---|---|---|---|---|---|
| 1 | A | 1.45 | A–B | A | A |
| 2 | B | 1.40 | B | B | A |

TABLE 2-continued

| Experimental Examples | Haze | OD | Strike-through | Edge Sharpness | Fixing Ability |
|---|---|---|---|---|---|
| 3 | C | 1.30 | B–C | C | A |
| 4 | A | 1.40 | B | A | A |
| 5 | D | 1.35 | D | D | A |
| 6 | D | 1.30 | D | D | A |
| 7 | D | 1.30 | D | D | A |
| 8 | D | 1.35 | D | D | A |

Out of the above evaluation items, "haze", "strike through" and "edge sharpness" were observed with naked eyes and expressed by A, B, C and D in the order from good to bad results. When the printed product was evaluated as B or higher, it was judged as satisfactory, and C and D were judged to fall within a tolerable range. More specifically, "edge sharpness" was evaluated comprehensively in view of conditions of "haze" and "feathering". "OD" was measured with a Macbeth optical densitometer and its measurement values were given herein. As for fixing ability, the time elapsed until reflection caused by liquid drops on the surface of printed paper, so-called "shining" disappeared, was measured. This was confirmed as a time interval of discharged paper sheets when a plurality of plain paper sheets were printed and discharged continuously and the rear side of discharged paper was not stained by the ink of paper discharged therebefore. Stated specifically, when this time interval was 1 second or less, fixing ability was evaluated as A and when it was 3 second or less, fixing ability was evaluated as B.

It is understood from the results of Table 2 above that even when the treating liquid contains 2% by weight or more of EBK and when ink is of a so-called overlapping type which will be described hereinafter, extremely good results are obtained.

Experimental Examples 9 to 16 were conducted in the same manner as in Experimental Examples 1 to 8 except that the application order of the treating liquid and ink was reversed. The results are shown in Table 3 below.

TABLE 3

| Experimental Examples | Haze | OD | Strike-through | Edge Sharpness | Fixing Ability |
|---|---|---|---|---|---|
| 9 | A | 1.55 | A | A–B | B |
| 10 | B | 1.50 | A–B | B | B |
| 11 | B–C | 1.40 | B–C | C | B |
| 12 | B | 1.50 | B | B | B |
| 13 | D | 1.40 | D | D | B |
| 14 | D | 1.35 | D | D | B |
| 15 | D | 1.35 | D | D | B |
| 16 | D | 1.40 | D | D | B |

It is understood from the results of Table 3 above that higher OD can be obtained when the treating liquid is applied to a recording medium after ink has been applied than when ink is applied to the recording medium after the treating liquid has been applied and that when the treating liquid contains 2% by weight or more of EBK and when ink is of an overlapping type, comprehensively extremely good results are obtained.

Treating liquid 5 having the following composition was prepared and a printed product was formed and evaluated in the same manner as described above.

| Treating liquid 5: | |
|---|---|
| PAA | 4% by weight |
| acetic acid | 4% by weight |
| Acetylenol EM | 2% by weight |
| glycerol | 7% by weight |
| diethylene glycol | 5% by weight |
| triethylene glycol monobutyl ether | 3% by weight |
| water | balance |

| Experimental Example | Ink | Treating Liquid | Application Order |
|---|---|---|---|
| 17 | A | 5 | Treating liquid and then ink |
| 18 | B | 5 | Treating liquid and then ink |
| 19 | A | 5 | Ink and then treating liquid |
| 20 | B | 5 | Ink and then treating liquid |

As a result, "haze" was observed in all of the printed products. Particularly in the printed products of Experimental Examples 19 and 20, "haze" was above the tolerable range. This is because PAA has a plurality of cationic groups in the molecule and the anionic groups on the surface of the self-dispersing pigment are not bonded to all of the cationic groups, whereby the combined product of the self-dispersing pigment and PAA becomes cationic and the combined products electrically repel one another, thereby making it difficult to form large aggregates as described above.

The following printing system of this embodiment is obtained from the evaluation results of the above experimental examples.

It can be understood that when EBK is contained in the treating liquid as an insolubilizing agent in an amount about ⅓ (1.6% by weight) or more the amount (5% by weight) of a pigment contained in black ink in either cases that the treating liquid is applied before the black ink or that it is applied after the black ink, printing qualities (such as haze, strike through, edge sharpness) and OD become excellent. OD and strike through are better when the treating liquid is applied after the black ink than when the treating liquid is applied before the blank ink. Even when a small amount of PAA is contained (1% by weight in this embodiment), if it is much smaller (about ⅓) than the amount (3% by weight) of EBK, good results can be obtained.

According to another embodiment of the present invention, a dye is further used as an ink coloring material in addition to the self-dispersing pigment used in the above embodiment.

Figure 3:
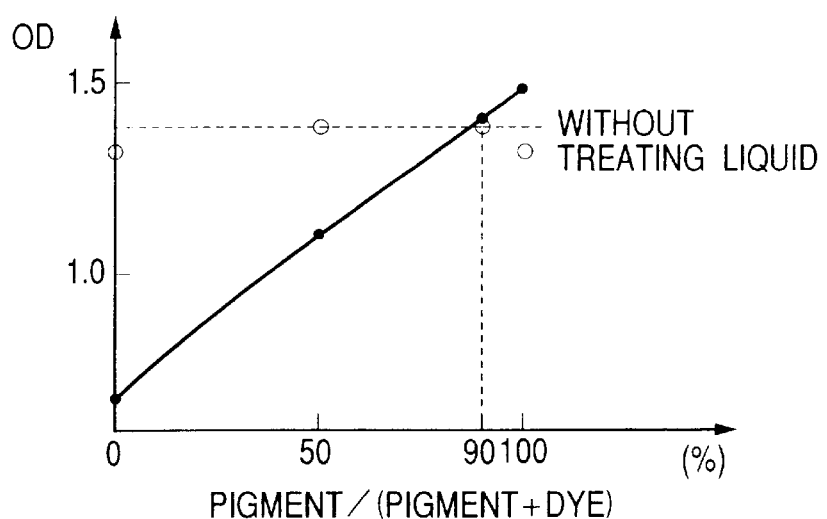
FIG. 3 is a graph showing changes in OD by the proportion of a pigment to the total of all the coloring materials according to another embodiment of the present invention.
Figure 4:
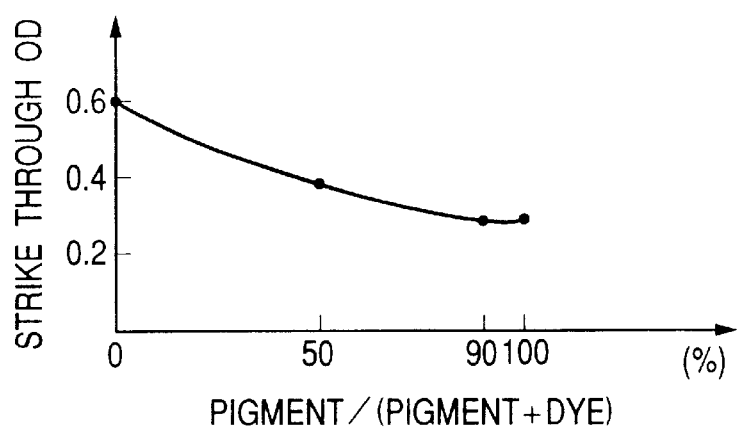
FIG. 4 is a graph showing changes in strike through OD by the proportion of the pigment according to the above another embodiment of the present invention.
Figure 5:
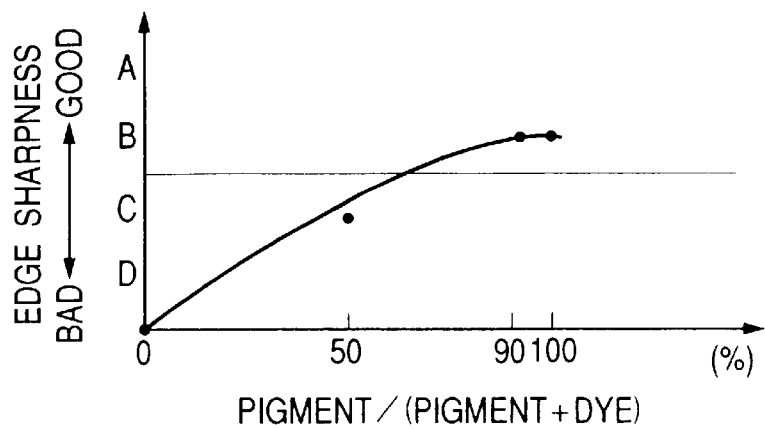
FIG. 5 is a graph showing changes in edge sharpness by the proportion of the pigment according to the above another embodiment of the present invention.

FIGS. 3 to 5 show the evaluation results of OD and printing qualities of this embodiment. Describing in detail, a treating liquid containing 4% by weight of EBK only as the insolubilizing agent and 2% by weight of Acetylenol EH which is the same amount as in the above embodiment has been used, and an ink coloring material which is a mixture of a self-dispersing pigment and a dye has been used. Printing conditions are the same as those of the above embodiment except that the treating liquid is applied after ink. Under the above conditions, OD, strike through OD (OD measured from the rear side of a printing medium) and edge sharpness were evaluated by changing the proportion (% by weight) of the pigment to the coloring material (pigment+dye) as shown in FIGS. 3 to 5.

As is obvious from these figures, when the proportion of the pigment to the coloring material is 90% by weight or more, OD becomes higher than that when the treating liquid is not used and the relatively good results of strike through and edge sharpness are obtained.

For the self-dispersing pigment, a treating liquid having high penetrability is prepared by adding Acetylenol which is a nonionic surfactant for the purpose of improving fixing ability in the above embodiment. The phenomenon of "haze" as another printing quality occurs irrespective of the penetrability of the treating liquid and may be seen large visually by the addition of a nonionic surfactant.

The above "EBK" is a cationic surfactant and also serves as a penetrating agent when it is added in a predetermined amount or more. Therefore, fixing ability is relatively high without a nonionic surfactant and, preferably, further improves when a nonionic surfactant is contained in the treating liquid.

A 51% aqueous solution of benzalkonium chloride under the trade name of Cation G50 was used as EBK.

In the above embodiment, there has been explained examples that the treating liquid is applied before a black ink or after a black ink. The treating liquid may be applied after the black ink and then the black ink may be applied again. Ink to be insolubilized by the treating liquid is not limited to the above black ink but may be other color ink such as magenta, cyan or yellow as a matter of course.

The above embodiments will be described hereinunder with reference to the accompanying drawings.

Figure 6:
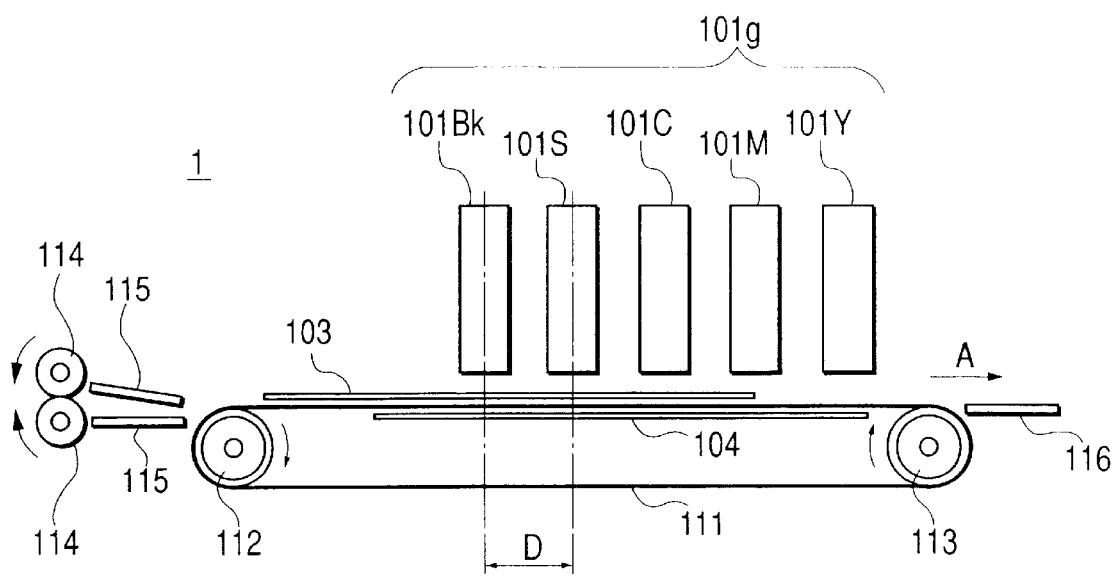
FIG. 6 is a side view showing the schematic structure of a printer according to an embodiment of the present invention.

FIG. 6 is a schematic drawing showing the schematic structure of a full-line type printing system according to an embodiment of the present invention.

This printing system 1 employs an ink printing system for printing by ejecting ink or the treating liquid from a plurality of full-line type print heads located at predetermined positions in the direction of feeding recording paper as a printing medium (direction shown by an arrow A in the figure) and operates under the control of an unshown control circuit.

The print heads 101Bk, 101S, 101C, 101M and 101Y of a head group 101g have about 7,200 ink ejection orifices in a width direction of recording paper fed in the direction shown by the arrow A (direction perpendicular to the paper in the figure) to print recording paper of A3 size at maximum.

The recording paper 103 is carried in the direction A by the rotation of a pair of resist rollers 114 driven by a motor, guided by a pair of guide plates 115 and conveyed by a conveyor belt 111 after the registration of the end thereof. The conveyor belt 111 which is an endless belt is held by two rollers 112 and 113, and the displacement in a vertical direction of the upper portion is restricted by a platen 104. By the rotation of the roller 113, the recording paper 103 is carried. The adsorption of the recording paper 103 to the conveyor belt 111 is carried out electrostatically. The roller 113 is rotated by an unshown drive source such as a motor in a direction for conveying the recording paper 103 in a direction shown by the arrow A. The recording paper 103 which is recorded with the recording head group 101g while it is conveyed on the conveyor belt 111 is discharged onto a stocker 116.

The print heads of the recording head group 101g form bubbles in a liquid using heat energy, eject the liquid by the pressure of the bubbles and consist of the head 101Bk for ejecting black ink which has been described in the above embodiment, a treating liquid head 101S for ejecting the treating liquid, and color ink heads (cyan head 101C, magenta head 101M, yellow head 101Y) which are arranged in the direction A of carrying the recording paper 103 as illustrated in the figure. Black characters and color images can be printed by ejecting ink for these colors and the treating liquid from the print heads.

In this embodiment, ink having low penetration speed like ink A described in Table 1 and Table 2 (to be referred to as "overlapping ink" in this embodiment) is used as a black ink to be ejected from the head 101Bk whereas a treating liquid and an ink each having high penetration speed (to be referred to as "high-penetrable ink" hereinafter in this embodiment) are used as the treating liquid and cyan, magenta and yellow inks to be ejected from the heads 101S, 101C, 101M and 101Y, respectively.

A brief description is given of the penetration speed.

It is known that when the penetrability of the treating liquid or ink (also simply referred to as "liquid" hereinafter) is expressed by the amount V of the liquid per m$^2$, the amount V of penetrated liquid (unit is ml/m$^2$=$\mu$m) at a time "t" since liquid drops are ejected is expressed by the following Bristow's equation.

$$V=Vr+Ka(t-tw)^{1/2}$$

where t>tw.

Right after a liquid drop falls on the surface of recording paper, most of the liquid drop is absorbed in the uneven portions of the surface (rough portions of the surface of recording paper) and does not penetrate into the interior of recording paper. This time interval is represented by tw (wet time) and the amount of liquid drop absorbed into the uneven portions during this time interval is represented by Vr. When the time elapsed after the fall of liquid drops is larger than tw, the amount of penetration V increases in proportion to an excess time $(t-tw)^{1/2}$. The above-described Ka is a proportional coefficient for this increase and represents a value corresponding to the penetration speed.

Figure 7:
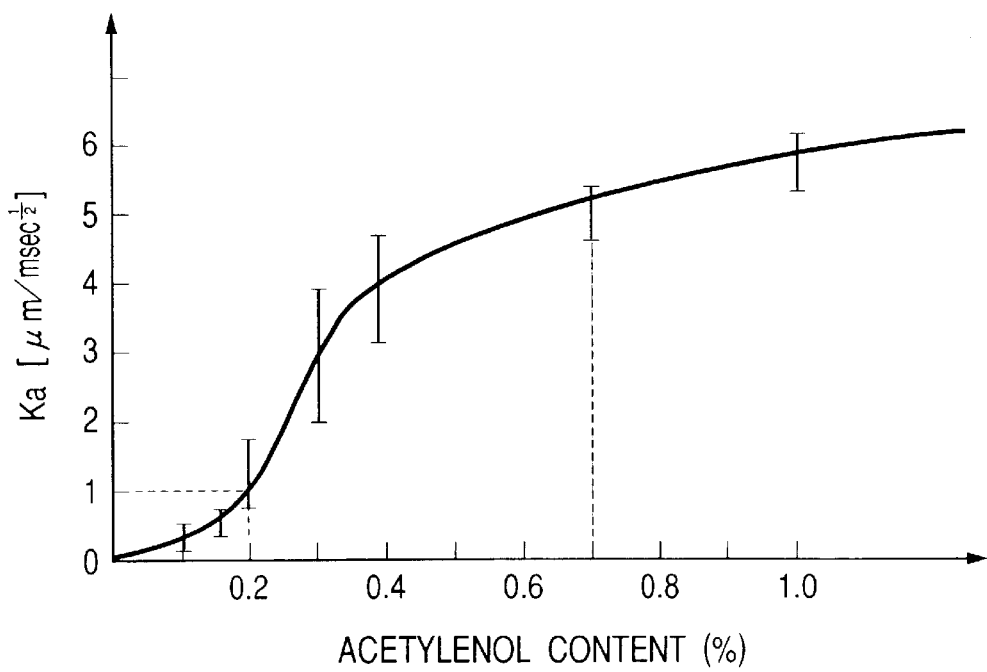
FIG. 7 is a graph showing the relationship between the content of Acetylenol and the Ka value regarding to a penetrability in the above embodiment.

FIG. 7 is a drawing showing the value of proportional coefficient Ka with respect to the content of Acetylenol in the liquid obtained by experiments.

The value of Ka was measured using a liquid dynamic penetrability tester S (by Toyo Seiki Seisakusho Co.) in accordance with the Bristow method. In the experiments, PB paper of Canon Inc. which is the present applicant is used as recording paper. This PB paper is recording paper which can be used for copiers and LBP of an electrophotographic system and printers of an ink-jet recording system.

The same results was obtained for PPC paper which is the electrophotographic paper of Canon Inc.

The curve shown in FIG. 7 shows the Ka value (axis of ordinates) which increases as the content of Acetylenol (axis of abscissa) becomes larger, and the proportional coefficient Ka is determined by the content of Acetylenol. Therefore, the penetration speed of ink substantially depends upon the content of Acetylenol. A linear segment parallel to the axis of ordinates which crosses the curve shows the range of variation of the measurement results.

Figure 8A:
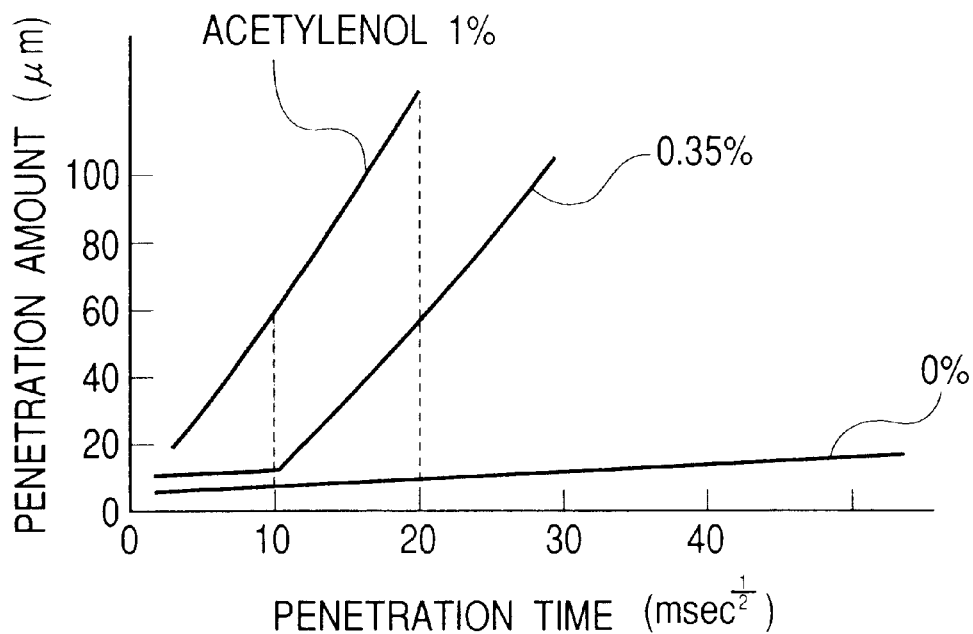
FIGS. 8A and 8B are graphs showing the relationship between penetration time after impact and the penetration amount using the content of Acetylenol related to a penetrability as a parameter.
Figure 8B:
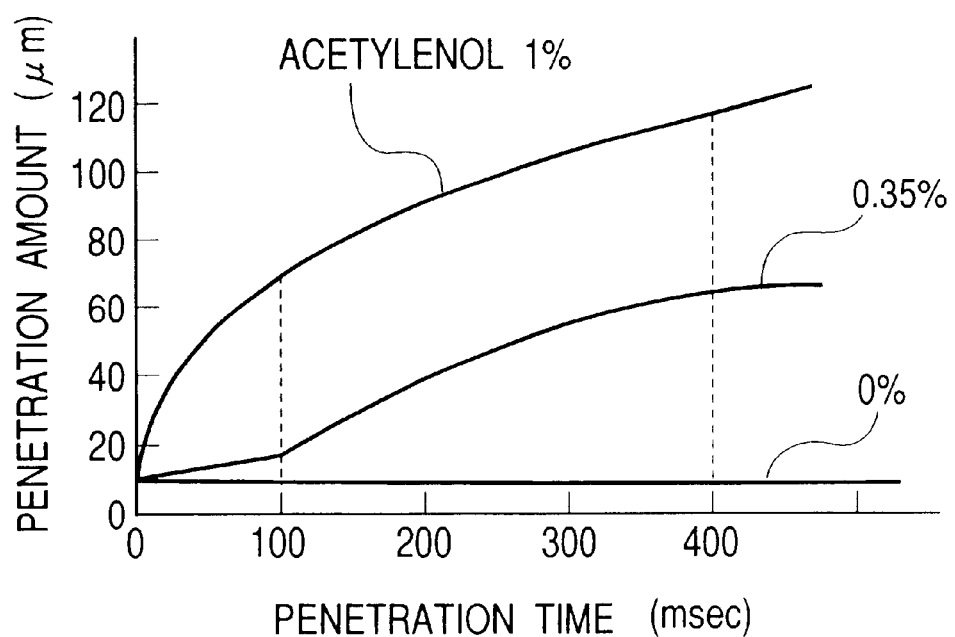

FIGS. 8A and 8B are characteristic drawings showing the relationship between the amount of penetration and penetration time which are the results of experiments using the above recording paper (PB paper) having a weight of 64 g/M$^2$, a thickness of about 80 $\mu$m and a void rate of about 50%.

The axis of abscissa in FIG. 8A shows penetration time expressed in msec$^{1/2}$ and the axis of abscissa in FIG. 8B shows penetration time expressed in msec. In both figures, the axis of ordinates shows the amount of penetration V ($\mu$m) and curves respectively obtained when the content of Acetylenol is 0%, 0.35% and 1% are shown.

As is obvious from the both figures, it can be said that as the content of Acetylenol increases, penetrability becomes higher with an increase in the amount of penetrated ink with respect to penetration time. The graphs shown in FIGS. 8A and 8B show a tendency that the wet time tw becomes shorter as the content of Acetylenol increases and that before tw is not reached, penetrability becomes higher as the content of Acetylenol increases.

A liquid containing no Acetylenol (content of 0%) has low penetrability and serves as overlapping ink which will be specified hereinafter. A liquid containing 1% of Acetylenol has the property of penetrating into the interior of recording paper 103 in a short period of time and serves as high-penetrable ink which will be specified hereinafter. Ink containing 0.35% of Acetylenol serves as semi-penetrable ink between them.

The characteristic properties of the "overlapping ink", "high-penetrable ink" and "semi-penetrable ink" which is an intermediate between them are shown in Y.

TABLE 4

| | Ka Value (ml/m$^2$ · msec$^{1/2}$) | Content of Acetylenol (%) | Surface Tension (dyn/cm) |
|---|---|---|---|
| Overlapping ink | less than 1.0 | less than 0.2 | 40 or more |
| Semi-penetrable ink | 0.1 or more and less than 5.0 | 0.2 or more and less than 0.7 | 35 or more and less than 40 |
| High-penetrable ink | 5.0 or more | 0.7 or more | less than 35 |

Table 4 above shows the Ka value, Acetylenol content (%) and surface tension (dyn/cm) of each of the "overlapping ink", "semi-penetrable ink" and "high-penetrable ink". The penetrability of each ink into recording paper as a printing medium becomes higher as the Ka value increases. That is, the penetrability becomes higher as the surface tension decreases.

The Ka value in Table 4 was measured using a liquid dynamic penetrability tester S (by Toyo Seiki Seisakusho Co.) in accordance with the above Bristow method. In experiments, the PB paper of Canon Inc. which is the present applicant has been used as recording paper. The same results were obtained for the PPC paper of Canon Inc.

It is known that conditions for containing a surfactant in a certain liquid include the critical micelle concentration (CMC) of the surfactant in the liquid. The term "critical micelle concentration" as used herein means a concentration when the concentration of a surfactant solution rises and several tens of molecules associate to form a micelle. Acetylenol contained in the above liquid to control penetrability is a type of surfactant and critical micelle concentration also exists in this Acetylenol according to a liquid.

When a micelle is formed, the surface tension does not decrease in the relationship between the content of Acetylenol and surface tension. It is confirmed from this result that the critical micelle concentration (CMC) of Acetylenol in water is about 0.7%.

When the critical micelle concentration shown in the figure is collated with Table 4 above, it is understood that the "high-penetrable ink" specified in Table 4 is ink containing Acetylenol in a concentration higher than the critical micelle concentration (CMC) of Acetylenol in water.

The compositions of the treating liquid and inks used in this embodiment are as follows. The amount of each component is expressed in parts by weight. The total amount of all the components is 100 parts by weight.

| [Treating liquid] | |
| --- | --- |
| glycerol | 7 parts |
| diethylene glycol | 5 parts |
| triethylene glycol monobutyl ether | 3 parts |
| Acetylenol EH (by Kawaken Fine Chemicals, Co., Ltd.) | 2 parts |
| benzalkonium chloride | 4 parts |
| water | balance |
| [Yellow (Y) ink] | |
| C.I. Direct Yellow 85 | 3 parts |
| glycerol | 5 parts |
| diethylene glycol | 5 parts |
| Acetylenol EH (by Kawaken Fine Chemicals, Co., Ltd.) | 1 part |
| water | balance |
| [Magenta (M) ink] | |
| C.I. Acid Red 289 | 3 parts |
| glycerol | 5 parts |
| diethylene glycol | 5 parts |
| Acetylenol EH (by Kawaken Fine Chemicals, Co., Ltd.) | 1 part |
| water | balance |
| [Cyan (C) ink] | |
| C.I. Direct Blue 199 | 3 parts |
| glycerol | 5 parts |
| diethylene glycol | 5 parts |
| Acetylenol EH (by Kawaken Fine Chemicals, Co., Ltd.) | 1 part |
| water | balance |
| [Black (Bk) ink] | |
| pigment dispersion | 45 parts |
| food black 2 | 0.4 part |
| glycerol | 6 parts |
| triethylene glycol | 5 parts |
| Acetylenol EH (by Kawaken Fine Chemicals, Co., Ltd.) | 0.2 part |
| water | balance |

The above pigment dispersion is as follows.

[Pigment dispersion]

1.58 g of anthranilic acid was added at 5° C. to a solution of 5 g of concentrated hydrochloric acid dissolved in 5.3 g of water. This solution was stirred in an iced bath to be always maintained at 10° C. or less and a solution of 1.78 g of sodium nitrite dissolved in 8.7 g of 5° C. water was added to this solution. After the resulting solution was further stirred for 15 minutes, 20 g of carbon black having a surface area of 320 m$^2$/g and a DBP oil absorption rate of 120 ml/100 g was added and mixed. Thereafter, the solution was stirred for another 15 minutes. The obtained slurry was filtered with a No. 2 Toyo filter (by Advantes Co., Ltd.), and pigment particles were thoroughly washed with water and dried in an oven heated at 110° C. Water was added to this pigment to prepare a pigment aqueous solution having a pigment concentration of 10% by weight. A pigment dispersion 3 containing anionic self-dispersing carbon black having a hydrophilic group bonded to the surface through a phenylene group was obtained.

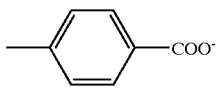

As is obvious from the above composition, according to the content of Acetylenol, black ink was prepared as an overlapping ink, and the treating liquid and C, M and Y inks were prepared as high-penetrable inks.

As for the black ink, as explained in the above embodiment, a dispersant-free pigment was used. A self-dispersion carbon black dispersion having at least one hydrophilic group bonded to the surface of carbon black directly or through another atomic group was advantageously used as an anionic carbon black dispersion in this ink. This type of self-dispersing carbon black is preferably ionic, more preferably charged anionic.

In the case of anionic carbon black, the hydrophilic group bonded to the surface is, for example, —COOM, —SO$_3$M, —PO$_3$HM, —PO$_3$M$_2$ (where M represents a hydrogen atom, alkali metal, ammonium or organic ammonium) or the like. In this embodiment, —COOM and —SO$_3$M which are bonded to the surface of carbon black and charged anionic are preferred out of these.

"M" in the above hydrophilic groups is an alkali metal such as lithium, sodium or potassium; and organic ammonium such as mono- to tri-methylammonium, mono- to tri-ethylammonium or mono- to tri-methanolammonium. As means of obtaining anionic carbon black, a method for oxidizing carbon black with sodium hypochlorite is used to introduce —COONa to the surface of carbon black. As a matter of course, the present invention is not limited to this.

In this embodiment, carbon black having a hydrophilic group bonded to the surface through another atomic group is preferably used. Other atomic groups include, for example, an alkyl group having 1 to 12 carbon atoms, and phenyl group which may have a substituent or naphthyl group which may have a substituent. Illustrative examples of the hydrophilic group bonded to the surface of carbon black through another atomic group include —C$_2$H$_4$COOM, —PhSO$_3$M and —PhCOOM (where Ph is phenylene) in addition to the above. As a matter of course, the present invention is not limited to these.

Since carbon black as a dispersant-free pigment has higher water dispersibility than conventional carbon black, it eliminates the need of adding a pigment dispersing resin or surfactant. Therefore, it has such advantages as excellent adhesive ability and wettability and high reliability when it is used for a print head compared with a conventional pigment.

By using the above black ink of this embodiment, a liquid containing carbon particles and a black dye charged the same polarity which are mixed together and dispersed therein is adhered to an ink receiving layer formed by a penetrable treating liquid containing a polymer having different polarity to form dots.

In this embodiment, the ink ejection orifices of each print head are arranged at a density of 600 dpi to carry out printing at a dot density of 600 dpi in the direction of feeding recording paper. Thereby, the dot density of an image or the like to be printed is 600 dpi in both a row direction and a column direction in this embodiment. The ejection frequency of each head is 4 kHz and the recording paper feed speed is therefore about 170 mm/sec. Further, as the distance D$_i$ between the black ink head 101Bk and the treating liquid head 101S (see FIG. 6) is 40 mm, the time interval from the time when black ink is ejected to the time when the treating liquid is ejected is about 0.24 second.

As for the particle size distribution of the self-dispersing pigment used in this embodiment, 80% of all the particles preferably has a particle size of 0.05 to 0.3 μm, more preferably 0.1 to 0.25 μm.

Figure 9:
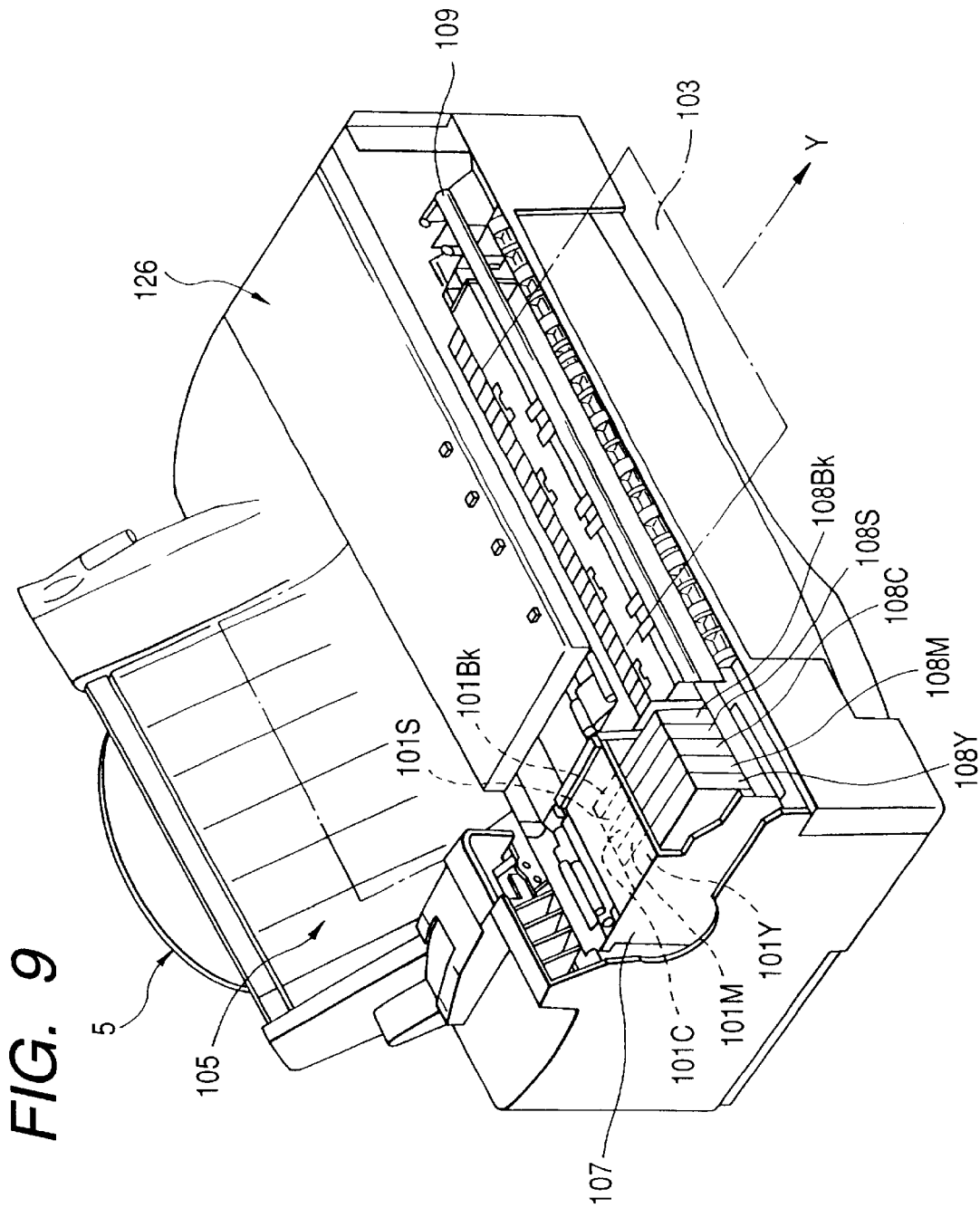
FIG. 9 is a perspective view of a serial printer according to another embodiment of the present invention.

FIG. 9 is a schematic perspective view showing the structure of a serial type printing system 5 according to another embodiment of the present invention. That is, it is obvious that the printing system for applying black ink to a printing medium followed by the treating liquid which is ejected thereto, which are then reacted with each other, is not limited to the above full-line type but may be of a serial type. The same elements as those shown in FIG. 6 are given the same reference symbols and their detailed descriptions are omitted.

The recording paper 103 is a printing medium inserted from a paper feeding portion 105 and discharged through a printing portion 126 in the direction shown by arrow Y. In this embodiment, inexpensive plain paper which is widely used is used as the recording paper 103. In the printing portion 126, a carriage 107 mounts the print heads 101S, 101Bk, 101C, 101M and 101Y and moves back and forth along a guide rail 109 by the drive force of an unshown motor. The print head 101S can eject the treating liquid described in the above embodiment. The print heads 101Bk, 101C, 101M and 101Y eject black ink, cyan ink, magenta ink and yellow ink, respectively. After the treating liquid is ejected, (e.g. after black ink is ejected), these inks are ejected onto the recording paper 103 in the above order.

The treating liquid and inks are supplied from ink tanks 108Bk, 108S, 108C, 108M and 108Y corresponding to the respective heads, a drive signal is supplied to an electric heater provided at the ejection orifice of each head at the time of discharging ink, thereby forming bubbles when heat energy acts on the inks and the treating liquid, and the inks and the treating liquid are ejected utilizing pressure at the time of foaming. Sixty-four (64) ejection orifices are provided at each head at a density of 360 dpi and arranged in substantially the same direction as the direction of feeding the recording paper 103, that is, a direction substantially perpendicular to the scanning direction of each head. The ejecting amount of each ejection orifice is any one of those embodiments described above.

In the above structure, since the distance between adjacent heads is 1 inch, the distance between the heads 101Bk and 101S is 1 inch. Further, since the printing density in the scanning direction is 720 dpi and the ejection frequency of each head is 7.2 kHz, the time interval from the time when black ink is ejected from the head 101Bk to the time when the treating liquid is ejected from the head 101S is 0.05 second.

As having been described above, according to the present invention, in order to carry out printing by combining ink containing at least a pigment as a coloring matter with a treating liquid, a surfactant having in the molecule one group having the same valence as that of the group of the above pigment and having polarity opposite to that of the group of the pigment is used in the above treating liquid, thereby making it possible to completely bond the group of the pigment to the group of the treating liquid and to enhance the cohesive force of pigment particles.

As a result, a combined product of the ink and the treating liquid shows high penetrability and does not form a dispersion containing fine aggregates but large uniform aggregates.

As a result, it achieves high printability without hazy bleeding and enables printing with excellent fixing ability.

What is claimed is:

1. A process for printing on a recording medium, comprising the steps of:
   (i) applying an ink on the recording medium with an ink-jet method; and
   (ii) applying a treating liquid to the recording medium, wherein the ink comprises at least a self-dispersing pigment having a first group with a polarity as a coloring material, and the treating liquid comprises a surfactant having in a molecule thereof only one second group with an opposite polarity to that of the first group of the self-dispersing pigment, and the self-dispersing pigment and the surfactant forming a combined product when the ink and the treating liquid are mixed on the recording medium,
   and wherein the steps (i) and (ii) are performed so that the combined product of the self-dispersing pigment and the surfactant is formed on the recording medium.

2. The ink printing method of claim 1, wherein the first group and a second group have the same valence.

3. The ink printing method of claim 1 or 2, wherein the treating liquid has a higher penetrability than the ink.

4. The ink printing method of claim 1, wherein a plurality of inks are applied and a proportion of the pigment to a total of all the coloring materials in the plurality of inks is 90% by weight or more.

5. The ink printing method of claim 1, wherein the pigment is carbon black.

6. The ink printing method of claim 5, wherein the coloring material contains carbon black and a dye.

7. The ink printing method of claim 1, wherein the treating liquid contains a nonionic surfactant as a penetrating agent.

8. The ink printing method of claim 7, wherein the penetrating agent contains a nonionic surfactant in a concentration higher than its critical micelle concentration in water.

9. The ink printing method of claim 7, wherein the concentration by weight of the nonionic surfactant in the treating liquid is ⅓ or more of the concentration by weight of the pigment in the ink.

10. The ink printing method of claim 1, wherein 80% or more of the pigment particles have a diameter of 0.05 to 0.3 μm.

11. The ink printing method of claim 10, wherein 80% or more of the pigment particles have a diameter of 0.1 to 0.25 μm.

12. An ink-jet printing system to conduct printing on a recording medium, comprising:
   (i) ink-jet means for applying an ink to the recording medium; and
   (ii) means for applying a treating liquid to the recording medium, the ink comprising at least a self-dispersing pigment having a first group with a polarity as a coloring material, and the treating liquid comprising a surfactant having in a molecule thereof only one second group with an opposite polarity to that of the first group of the self-dispersing pigment, and the self-dispersing pigment and the surfactant forming a combined product when the ink and the treating liquid are mixed on the recording medium,
   wherein the ink-jet means and the means for applying a treating liquid work respectively so that the combined product is formed on the recording medium.

13. The ink-jet printing system of claim 12, wherein the first group and a second group have the same valence.

14. The ink-jet printing system of claim 12, wherein the treating liquid has a higher penetrability than the ink.

15. The ink-jet printing system of claim 12, wherein the ink-jet means applies a plurality of inks and a proportion of the pigment to the total of all the coloring materials of the plurality of inks is 90% by weight or more.

16. The ink-jet printing system of claim 12, wherein the pigment is carbon black.

17. The ink-jet printing method of claim 16, wherein the coloring material contains carbon black and a dye.

18. The ink-jet printing system of claim 12, wherein the treating liquid contain a nonionic surfactant as a penetrating agent.

19. The ink-jet printing system of claim 18, wherein the penetrating agent contains a nonionic surfactant in a concentration higher than its critical micelle concentration in water.

20. The ink-jet printing system of claim 18, wherein the concentration by weight of the nonionic surfactant in the treating liquid is ⅓ or more the concentration by weight of the pigment in the ink.

21. The ink-jet printing system of claim 12, wherein 80% or more of the pigment particles have a diameter of 0.05 to 0.3 μm.

22. The ink-jet printing system of claim 12, wherein 80% or more of the pigment particles have a diameter of 0.1 to 0.25 μm.

23. The ink-jet printing system of claim 12, wherein the ink and the treating liquid are ejected from respective print heads and deposited to printing paper, the print heads form bubbles in the ink and the treating liquid utilizing heat energy, and the ink and the treating liquid are ejected by the pressure of the bubbles.

24. An ink-set comprising an ink containing a self-dispersing pigment having a first group with a polarity as a coloring material; and a treating liquid containing a surfactant having only one second group in a molecule thereof, the second group having an opposite polarity to that of the first group in the ink, the surfactant forming with the self-dispersing pigment a combined product when the ink and the treating liquid are mixed on a recording medium.

* * * * *

UNITED STATES PATENT AND TRADEMARK OFFICE
CERTIFICATE OF CORRECTION

PATENT NO.     : 6,367,923 B1
DATED          : April 9, 2002
INVENTOR(S)    : Noribumi Koitabashi et al.

It is certified that error appears in the above-identified patent and that said Letters Patent is hereby corrected as shown below:

Column 3,
Line 45, "pricky" should read -- prickly --.

Column 9,
Line 50, "was" should read -- were --.

Column 14,
Line 20, "a" should read -- the --; and "the" should read -- a --.
Line 65, "a" should read -- the --; and "the" should read -- a --.

Column 15,
Line 10, "contain" should read -- contains --.

Signed and Sealed this

Thirty-first Day of December, 2002

JAMES E. ROGAN
*Director of the United States Patent and Trademark Office*